No. 751,970.                                                                 Patented February 9, 1904.

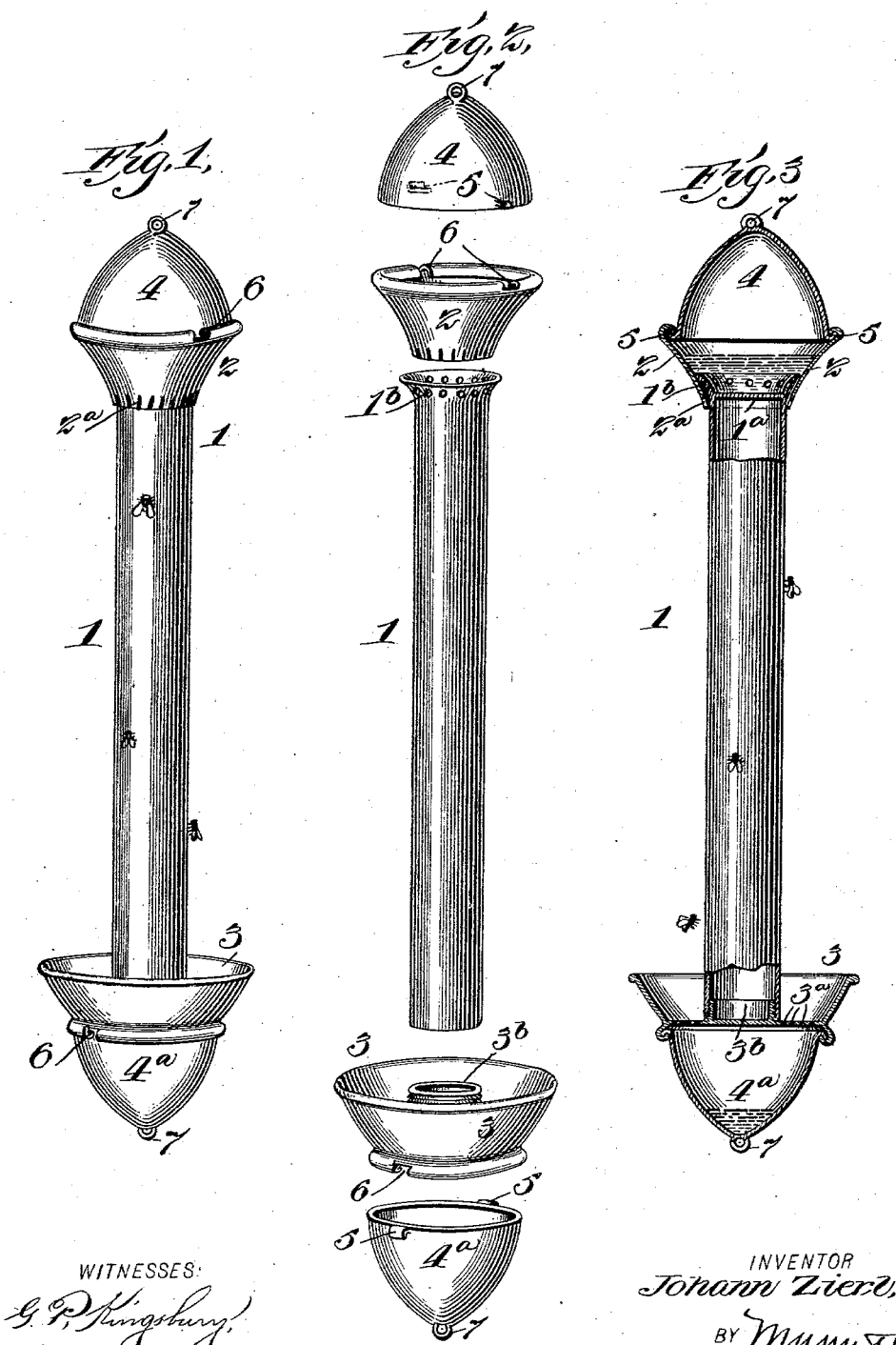

UNITED STATES PATENT OFFICE.

JOHANN ZIERL, OF HECHINGEN, GERMANY.

FLY-CATCHER.

SPECIFICATION forming part of Letters Patent No. 751,970, dated February 9, 1904.

Application filed August 18, 1903. Serial No. 169,892. (No model.)

*To all whom it may concern:*

Be it known that I, JOHANN ZIERL, a subject of the Emperor of Germany, and a resident of Hechingen, in the Province of Hohenzollern and Empire of Germany, have made certain new and useful Improvements in Fly-Catchers, of which the following is a specification.

My invention is an improvement in that class of fly-catchers a feature of which is a standard or post to which some tacky substance is applied.

My invention is embodied in a body or bar provided at the top with a reservoir or holder for the tacky substance and at the lower end with a reservoir for the flies, also with detachable end portions which are adapted to receive the tacky substance and to be interchanged when the lower one becomes full.

The details of construction, arrangement, and operation are as hereinafter described, reference being had to the accompanying drawings, in which—

Figure 1 is a perspective view of my improved fly-catcher. Fig. 2 is a perspective view showing the several parts of the fly-catcher disassociated. Fig. 3 is in part a side elevation and in part a longitudinal section of the fly-catcher.

The elongated body 1 of the fly-catcher is preferably constructed in tubular form and cylindrical, and is conveniently and cheaply produced in the form of a metal tube. The upper end is provided with a flared attachment 2, which constitutes a holder or reservoir for the tacky substance employed. To the lower end is attached a part 3, which serves as a holder for the flies, the same being provided with a perforated or sieve bottom $3^a$, as shown in Fig. 3. The ends of the device consist of conical caps 4 and $4^a$, which are detachable from the parts 2 and 3, respectively, and are also interchangeable. These parts 4 $4^a$ serve alternately as receptacles for the tacky fluid, as will be further explained. The upper end of the tube 1 is closed at $1^a$, and the flared extension $1^b$ is provided with a series of holes, as shown in Fig. 3. The flared piece 2 surrounds the flanged portion $1^b$ and is permanently secured thereto. Its lower edge is provided with a series of openings or slits $2^a$, as shown in Figs. 1, 2, and 3. Some tacky or adhesive substance which is in a semifluid condition and of a quality that is attractive to flies is placed in the holder 2, and the device being suspended in vertical position such substance flows through the holes in the flange $1^b$ and through the adjacent slits or openings in the lower edge of the part 2, whence it flows down over and smears the entire surface of the body 1. The flies alighting upon the smeared body 1 are held fast by reason of the adhesive quality of the substance and gradually find their way downward into the holder 3, where their further progress is arrested by the sieve $3^a$, while the tacky substance passes on into the receptacle $4^a$. When the latter is full or nearly full, it is detached and interchanged with the upper cap 4—that is to say, the upper cap is attached to the fly-holder 3 and the lower cap to the reservoir 2. Thus the tacky substance contained in the cap $4^a$ flows out of the same into the holder 2 and thence down over the body 1, as before described. It will be understood that this interchange of the caps 4 and $4^a$ is made whenever the lower one becomes filled.

In order to provide for convenient detachment and interchange of the caps 4 and $4^a$, they are attached to the respective parts 2 and 3 by means of a form of bayonet-joint—that is to say, each cap is provided with two opposite lateral lugs 5, and the respective upper and lower inturned rims of the parts 2 and 3 are provided with corresponding notches 6. It is apparent that attachment may be effected by applying either cap in such manner that the lugs register with the slots or notches 6 and then turning the cap part way round, and, further, that detachment is effected by reversing this operation. It is also necessary that the fly-holder 3 shall be adapted for convenient detachment from the tube 1. To this end its sieve-bottom is provided with a central cylindrical and threaded collar $3^b$, (see Figs. 2 and 3,) which is adapted to be screwed into the lower end of the tube 1. Thus the part 3 may be readily detached whenever a sufficient number of flies has accumulated therein.

The caps 4 and 4ª are provided with eyes or rings 7, whereby provision is made for conveniently suspending the device in any place.

It will be understood that I do not restrict myself to the precise form of parts nor to the precise means for detachable connection of parts, since these may be varied within certain wide limits without departing from the spirit of my invention.

Having thus described my invention, what I claim as new, and desire to secure by Letters Patent, is—

1. The improved fly-catcher comprising an elongated body, and interchangeable end receptacles, the same being adapted for suitable attachment and detachment in the manner described.

2. The improved fly-catcher comprising a body, end portions which are attached thereto, and interchangeable receptacles for the tacky fluid employed, said receptacles being adapted for convenient attachment to and detachment from such end portions, substantially as described.

3. The improved fly-catcher, comprising an elongated body, a reservoir for a tacky fluid, and a fly-holder applied to the respective ends of the body, and detachable and interchangeable receptacles for the tacky fluid, the same being applied as the terminals of the device, substantially as shown and described.

4. The improved fly-catcher, comprising a cylindrical metal tube constituting the body of the device, the same having a closed top and an extended perforated flange, a reservoir for a tacky fluid which incloses said flange and is provided with openings for escape of the fluid, substantially as described.

5. In a fly-catcher of the class indicated, the combination, with the central elongated body having its end portions provided with similar locking or engaging parts, of a cap which is adapted for ready attachment to and detachment from each of such end parts, as and for the purpose specified.

JOHANN ZIERL.

Witnesses:
EWALD DANIEL,
WM. HAHN.